United States Patent [19]
Moorehead

[11] 3,791,586
[45] Feb. 12, 1974

[54] COMBINATION CLAMSHELL THRUST REVERSER & VARIABLE NOZZLE AREA RAMP

[75] Inventor: James R. Moorehead, Bellevue, Wash.

[73] Assignee: The Boeing Company, Seattle, Wash.

[22] Filed: Dec. 26, 1972

[21] Appl. No.: 317,908

[52] U.S. Cl........... 239/265.29, 239/265.37, 60/230
[51] Int. Cl. ............................................. B64c 15/04
[58] Field of Search.. 60/229, 230; 244/12 D, 23 D, 244/52; 239/265.29, 265.37, 265.27, 265.19, 265.41, 265.37

[56] References Cited
UNITED STATES PATENTS
3,028,730  4/1962  Clark ......................... 239/265.41 X
3,080,711  3/1963  Connors........................ 239/265.37
3,667,680  6/1972  Weed........................ 239/265.29 X Primary Examiner—M. Henson Wood, Jr.
Assistant Examiner—John J. Love
Attorney, Agent, or Firm—Glenn Orlob

[57] ABSTRACT

A failsafe thrust reverser for a jet aircraft engine wherein the reverser unit comprises a pair of clamshell blocker doors pivotally mounted about vertical axes for rotational actuation. The reverser unit is positioned within a D-shaped or two-dimensional exhaust nozzle duct that has a variable area ramp on its bottom planar surface. The failsafe feature is provided by the variable ramp being positioned within the rotational arc of the clamshell blocker doors such that when the ramp is in its raised or high cruise speed position, the ramp through a blocking action, mechanically jams the blocker doors so that they can not rotate to the reverse thrust position.

4 Claims, 5 Drawing Figures

PATENTED FEB 12 1974 3,791,586

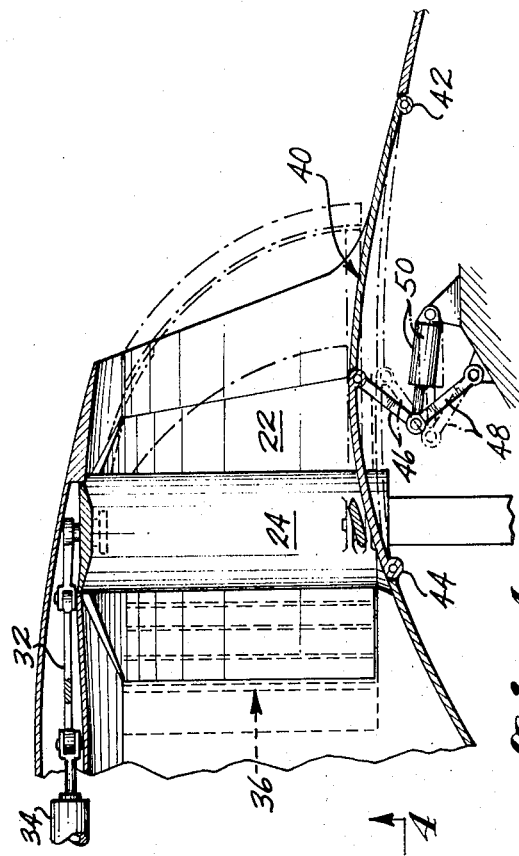
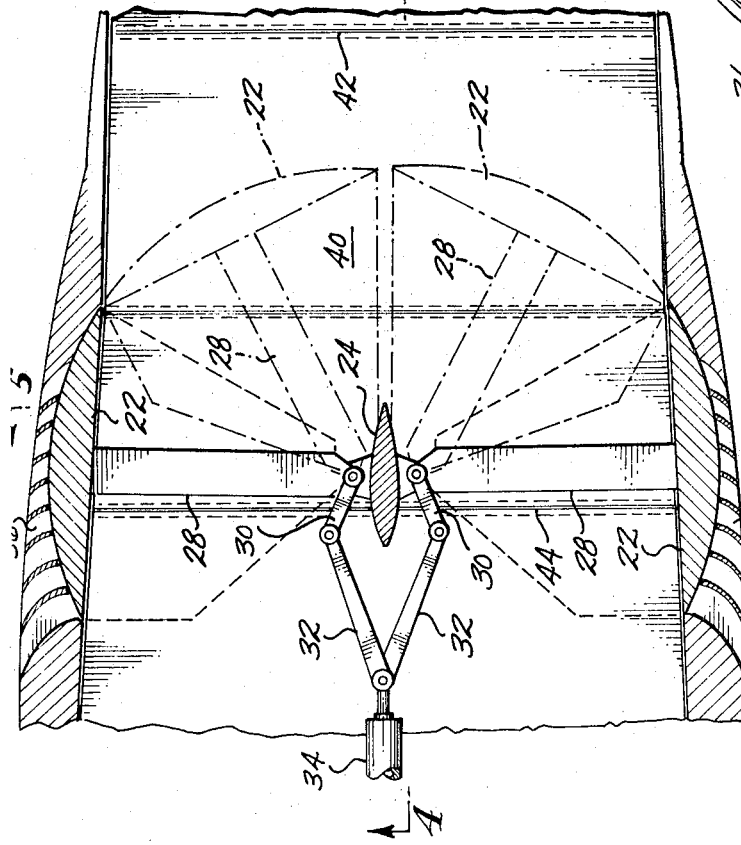
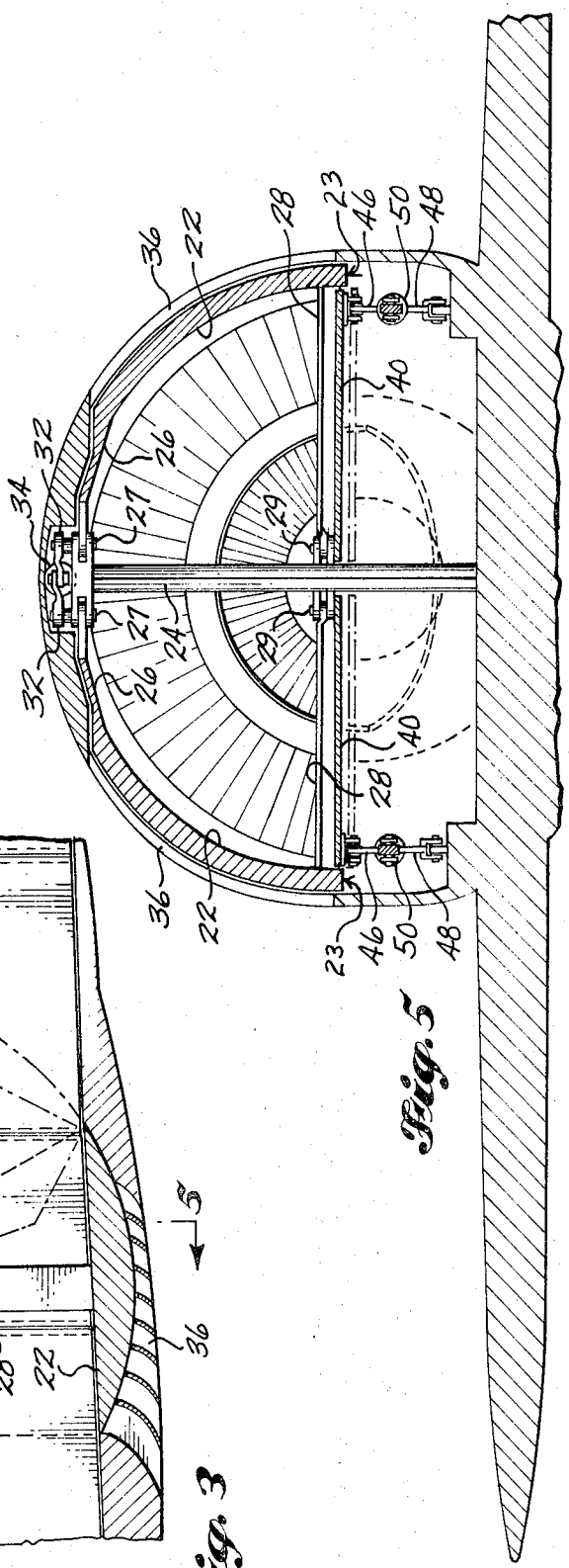

COMBINATION CLAMSHELL THRUST REVERSER & VARIABLE NOZZLE AREA RAMP

SUMMARY OF THE INVENTION

The invention relates to the failsafe operation of a thrust reverser by its interacting cooperation with a variable area nozzle and more particularly to a thrust reverser for use in a D-shaped or two-dimension exhaust nozzle duct having a variable area ramp on its bottom planar surface. The thrust reverser comprises a pair of clamshell blocker doors pivotably mounted for rotation about vertical axes to an inward and aft position so as to deflect the jet engine flow laterally through cascade reverser vanes which are normally blocked by the blocked doors in their retracted position. The variable nozzle area ramp when positioned at its raised up, high speed, cruise position, provides the failsafe feature in the system; because, when it is in this cycle of operation, the clamshell doors are mechanically jammed by the blocking action of the ramp and cannot be displaced from their retracted or stowed position in the nozzle wall.

One of the disadvantages of the present known thrust reverser systems, is that they are "suspect," i.e., the fan reversers and particularly the translating cascade reversers such as on the Boeing 747 and 707 type aircraft are "suspect" because if they are not rigged right or vibration loosens the connections, etc., after awhile the parts may not fit so good and the thrust reversers have been known to slip back in cruise flight or in a maximum power climb, and the blocker doors have been forced down into the gas flow and reverse the thrust vector with high power on the engine. But in the present invention, once the variable area nozzle ramp is in the up or minimum area high speed cruise position, it provides the safety feature to thrust reversal since the clamshell blocker doors are mechanically jammed from going into the reverse position.

At high speed the airplane would be operated such that the variable ramp 40 would be at its upper position to set the cross-sectional throat area of the exhaust nozzle at the minimum area. In the event that the pilot, after take-off, found that he couldn't position the ramp 40 to the up position, then the safety feature would be inoperative. Since the normal cycle of operation has malfunctioned, the pilot will know by his instrumentation and by the fact that he is consuming more fuel that the ramp is stuck in the down position. Although the aircraft would be consuming more fuel with the larger throat area due to a decrease in engine operating efficiency, it could still be safely operated. The variable area nozzle, in addition to providing for a more efficiently operating propulsion system also produces less noise when the exhaust throat area is positioned at its maximum area. In normal operation, the exhaust nozzle would be positioned at its minimum throat area for high speed cruise efficiency and at the maximum area for sound suppression.

Now, in the other event, where the aircraft is being operated in the high speed cruise condition and the nozzle ramp becomes jammed in the up position, it would mean that the pilot could not get reverse thrust on that engine after the airplane touched down. But the chances are that as he starts to slow down and descend for the landing approach, that as he makes his normal operating procedure instrument check he will discover that the engine exhaust nozzle had not adjusted to the low speed, maximum throat area position for the sound suppression mode and that the engine thrust could not be reversed. Therefore, he will have to make his landing approach accordingly, and use his brakes for stopping. Although this is a change from normal operating procedure, it still would not be as hazardous as an engine inadvertently going into reverse thrust.

One of the objects of the present invention is to provide a simple reverser blocker system in a variable area nozzle and more particularly in a tail mounted engine arrangement wherein the reverse thrust must be symmetrical or equal about the centerline of the fuselage in order that the reverse flow does not blow upward onto the tail surfaces.

Another object is to provide a failsafe feature to a thrust reverser system utilizing clamshell deflector doors in a D-shaped or two-dimensional nozzle duct having a variable nozzle area ramp on its bottom surface.

Another object is to provide a mechanically blocked thrust reverser once the cycle of engine operation positions the exhaust nozzle area to the aircraft cruise speed condition.

These, together with other objects, features and advantages of the invention, will become more apparent from the following detailed description when taken in conjunction with the illustrative embodiment in the accompanying drawings.

BRIEF DESCRIPTION OF THE DRAWINGS

FIG. 3 is an enlarged fragmentary top view of the clamshell thrust reverser in a D-shaped exhaust duct;

FIG. 4 is an enlarged side elevational of FIG. 3, depicting the clamshell blocker doors in combination with the variable area ramp forming the bottom surface of the exhaust nozzle duct;

FIG. 5 is an enlarged rear view of the exhaust nozzle taken along line 5—5 of FIG.3.

DESCRIPTION OF THE PREFERRED EMBODIMENTS

Figure 1:
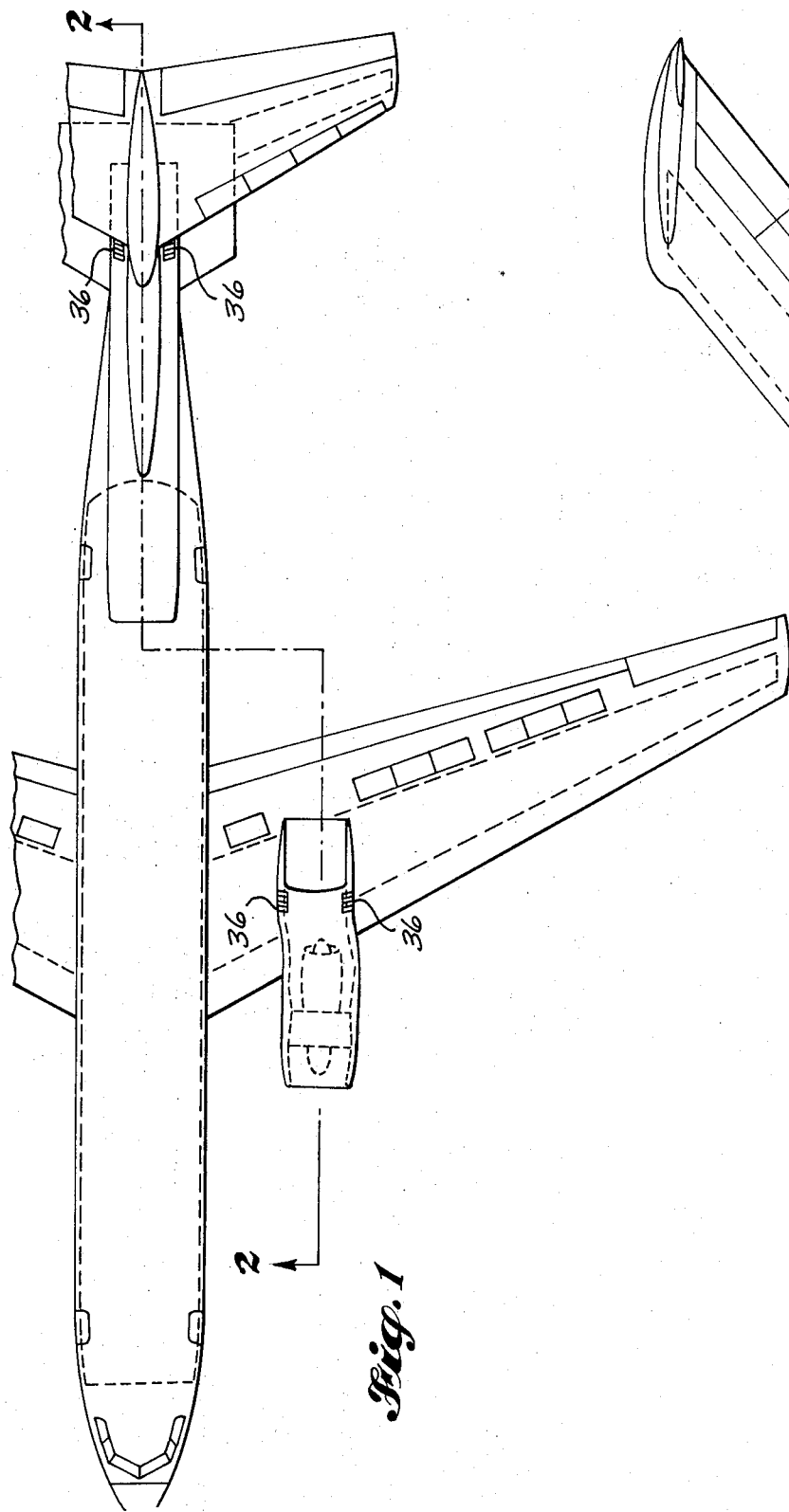
FIG. 1 is a plan view of a tri-jet airplane incorporating the over-wing, D-shaped exhaust nozzle arrangement with a similar exhaust system in combination with a horizontal member in the tail assembly.
Figure 2:
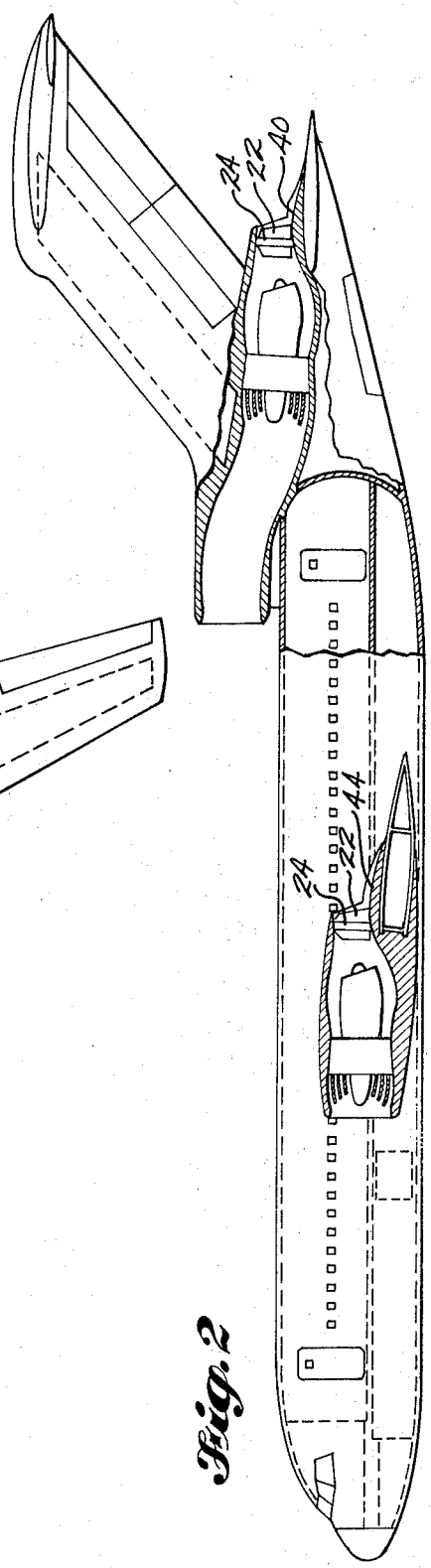
FIG. 2 is a side elevational view of the tri-jet airplane shown in FIG. 1 with certain parts being shown cutaway to appear in cross section as indicated along line 2—2.

FIGS. 1 and 2 depict a tri-jet aircraft with similar D-shaped exhaust nozzle arrangements on the wing and in the tail; wherein, the engine exhaust flow is directed over the upper surface of a horizontal member for upward deflection of the exhaust sound. FIGS. 3–5 show, by enlarged views, the D-shaped exhaust nozzle section wherein the flat side is down on a horizontal surface such as a wing or sound shielding surface in the tail of a three-engined airplane. Within the exhaust nozzle section are two clamshell doors 22, rotatably mounted to a vertical center strut 24 by an upper vane arm 26 pivoted at 27 and a lower vane arm 28 pivoted at 29. In addition to furnishing support for the clamshell blocker doors, the vertical center strut 24 also provides for D-duct rigidity and nozzle area fixity. The center strut 24 is rigidly fastened at its lower end to structure and projects upwardly therefrom; clear through the variable ramp 40 and is fastened to the top of the D- shaped duct wall. The center strut 24 provides for greater solidity of structure and strengthens the cross-sectional area contour of the nozzle to retain its D-shape and thereby helps to hold and control a predetermined nozzle exit area. To provide symmetrical reverse thrust in the plan view of the airplane, the chamshell doors 22 are rotated through their crank arms 30 and links 32 by actuator 34 to their inward aft position thereby exposing the fixed cascades 36 in the wall of the nozzle duct and deflecting the exhaust flow therethrough in a forward vector. However, it should be noted that the chamshell doors in rotating to their aft reverse thrust position must clear the variable ramp 40 which forms the bottom surface or flat side of the D-shaped exhaust nozzle. The ramp 40 has its aft end pivotally connected at 42 to structure and its forward end connected to structure through a slip joint 44. The ramp 40 is raised and lowered through a scissors linkage 46, 48 by an actuator 50.

When the airplane is operated at low speeds such as for take-off and landing, the pilot in his airplane operating procedures, lowers the ramp 40 to its down position; whereat, the lower lip or edge 23 of the clamshell doors 22 is above the upper surface of the ramp 40 and being clear of the ramp, the clamshell doors are free to be rotatably actuated to their reverse thrust position.

However, at high airplane speeds, where the pilot through his operating procedures has adjusted the exhaust nozzle to its minimum exit plane area by raising the ramp 40 to its upper position, the clamshells are in their stowed or nonreverse thrust mode and any attempt to uncover the cascades 36 by rotation of the clamshell doors 22 would be mechanically blocked by the lower edge 23 of the doors engaging the side edge of the ramp 40. The fact that the ramp 40 is vertically adjustable within the rotational arc of the clamshells leads to the safety feature of the present invention which is that when the ramp is moved up for minimum exhaust nozzle exit area at high speeds, it prevents any action of the reverser.

While the invention has been disclosed with reference to a preferred embodiment, it is to be understood that those modifications and changes which become obvious to a person skilled in the art as a result of the teachings hereof, will be encompassed by the following claims:

What is claimed is:

1. In combination with a jet engine exhaust nozzle system: a variable ramp for controlling the size of the nozzle opening, means for reversing the jet engine exhaust flow, and said variable ramp being adapted to prevent movement of said thrust reversing means when said ramp is displaced from its maximum sized opening position.

2. In combination with a jet engine exhaust duct and nozzle system: a planar surface within the exhaust duct and extending beyond the exhaust nozzle exit, a ramp mounted in the planer surface of the exhaust duct and inwardly movable for forming a variable throat area in the exhaust nozzle, means for reversing the jet engine exhaust flow, said means being positioned adjacent to the ramp such that inward displacement of the ramp to a minimum throat area position prevents the jet engine exhaust flow from being reversed.

3. In combination with a variable exhaust nozzle for a jet propulsion engine, a thrust reverser unit, said exhaust nozzle having an internal duct wherein one side of which forms a planar surface, an adjustable ramp forming a portion of the planer surface and movable between a retracted position and an extended portion for forming a variable throat section within the exhaust nozzle duct, said thrust reverser unit comprising an exhaust flow deflecting member positioned adjacent to the adjustable ramp and mounted for rotation within the duct such that the deflecting member is prevented from movement to the thrust reversal position when the ramp is in an extended position.

4. A fail-safe thrust reversing system for a jet engine exhaust nozzle having a D-shaped flat bottomed duct comprising: an adjustable ramp mounted in the bottom planer surface of the duct and movable vertically for forming a variable area throat section in the exhaust nozzle; a pair of clamshell doors pivotally mounted in the duct for rotation about a vertical axis and for reversing the jet engine exhaust flow when the ramp is down at its maximum throat area position; the ramp being positioned within the rotational arc of the clamshell doors such that when the ramp is displaced upwardly toward a minimum throat area position, the clamshell doors mechanically abut the upwardly displaced ramp and thereby provide the fail-safe feature by preventing movement of the clamshell doors to their reverse position.

* * * * *

UNITED STATES PATENT AND TRADEMARK OFFICE
CERTIFICATE OF CORRECTION

PATENT NO. : 3,791,586
DATED : February 12, 1974
INVENTOR(S) : James R. Moorehead It is certified that error appears in the above-identified patent and that said Letters Patent are hereby corrected as shown below:

Assignees: The Boeing Company, Seattle, Washington; Aeritalia S.p.A., Naples, Italy Signed and Sealed this Twenty-fourth Day of August 1976

[SEAL]

Attest:

RUTH C. MASON
*Attesting Officer*

C. MARSHALL DANN
*Commissioner of Patents and Trademarks*